United States Patent [19]
Durst et al.

[11] Patent Number: 5,563,406
[45] Date of Patent: Oct. 8, 1996

[54] OPTICAL SENSOR AND A METHOD OF OPERATING AN OPTICAL SENSOR HAVING AN ELECTRONIC SWITCHING CIRCUIT

[75] Inventors: David I. Durst, Syosset, N.Y.; Patrick L. Hayman, Mission Viega, Calif.; Martin Klop, Great River, N.Y.

[73] Assignee: Northrop Grumman Corporation, Los Angeles, Calif.

[21] Appl. No.: 409,363

[22] Filed: Mar. 23, 1995

[51] Int. Cl.$^6$ .................................................. H01J 40/14
[52] U.S. Cl. .................... 250/208.2; 250/208.4; 250/214 SW
[58] Field of Search ............... 250/208.1, 208.2, 250/208.3, 208.4, 332, 216, 214 SW; 244/3.16, 3.17

[56] References Cited

U.S. PATENT DOCUMENTS

| | | | |
|---|---|---|---|
| 4,471,227 | 9/1984 | D'Ascenzo | 250/208.1 |
| 4,675,532 | 6/1987 | Carson | 250/578 |
| 4,814,629 | 3/1989 | Arnold | 250/578 |
| 5,126,552 | 6/1992 | Hayes, Jr. | 250/208.4 |
| 5,151,588 | 9/1992 | Kiri et al. | 250/208.1 |
| 5,235,176 | 8/1993 | Noble et al. | 250/208.2 |
| 5,304,790 | 4/1994 | Arnold | 250/208.1 |
| 5,406,067 | 4/1995 | Keller | 250/208.1 |
| 5,424,529 | 6/1995 | Hasimoto et al. | 250/208.1 |

Primary Examiner—Stephone Allen
Attorney, Agent, or Firm—Terry J. Anderson; Karl J. Hoch, Jr.

[57] ABSTRACT

An optical sensor and a method of operating an optical sensor. The sensor comprises a multitude of pixels, a multitude of optical detectors, an amplifier and a switching circuit. Each of the pixels includes an optical detector for generating an electric signal representing the intensity of light incident on the pixel. The switching circuit is electrically connected in series between the amplifier and the optical detectors for conducting the electric signals from the optical detectors to the amplifier in a predetermined manner. Preferably, the switching circuit includes a multitude of switches, and each switch is used to control the transmission of the signal from a respective one of the optical detectors to the amplifier.

18 Claims, 2 Drawing Sheets

OPTICAL SENSOR AND A METHOD OF OPERATING AN OPTICAL SENSOR HAVING AN ELECTRONIC SWITCHING CIRCUIT

BACKGROUND OF THE INVENTION

This invention generally relates to optical sensors, and more specifically, to staring optical sensors.

A staring optical sensor is usually a two-dimensional focal plane mosaic of photodetectors, each of which generates an electric current representing the intensity of light incident on a given area of observation, referred to as a pixel and representing one unit of resolution. Typically, the area behind each photodetector is used for electronic circuitry to amplify and multiplex the detector signal.

In a high resolution staring optical sensor, the photodetectors are quite small and are located very close to each other, with no or only very little space between adjacent detectors. As a result, the distance between centers of adjacent detectors, referred to as the center-to-center spacing, is quite small. As the center-to-center spacing is reduced—either by using smaller detectors or by locating the detectors closer together—the space behind each detector for the required electronic circuitry functions is also reduced.

Increasing the spacing between detectors while keeping the size the individual detectors fixed, increases the available area or space for the required electronic circuitry, but also introduces undesirable gaps between detectors. With a sensor having such gaps, the image of a target of interest that falls within a gap between detectors would be invisible to the sensor until that image moved onto one of the detectors.

Various approaches are used to decrease the pixel size in an optical sensor while still providing adequate space behind each photodetector for the necessary electronic circuitry. For example, with one arrangement, the pixels in the sensor are divided into groups and one photodetector and an associated electrical circuitry are provided for each group of pixels. In the operation of the sensor, a mirror, referred to as a toggle mirror, is used to scan, or toggle, the pixels of each group, one pixel at a time, over the photodetector for that pixel group.

A toggle mirror, however, is relatively heavy and the operation of the mirror may consume a significant amount of power. Furthermore, some optical sensors include several focal planes, and when a toggle mirror is used to shift the image incident on the sensor, the toggle mirror causes the image to shift globally over all of the focal planes of the sensor. Under some circumstances, though, such sensors operate more effectively if the image is not toggled on some of the focal planes of the sensor, or if the image is toggled differently on different focal planes.

SUMMARY OF THE INVENTION

An object of this invention is to improve optical sensors.

Another object of the present invention is to substitute an electronic circuit for a toggling mirror in an optical sensor.

A further object of this invention is to connect a multitude of photo detectors of an optical sensor to a common amplifier.

Another object of the present invention is to control toggling independently for each small group of detectors of an optical sensor.

An object of the present invention is to provide an optical sensor with a multitude of photodetectors that are connected to a single amplifier, and to operate a series of electronic switches, located between the photodetectors and the amplifier, so that the signal from no more than one photodetector at a time is conducted to the amplifier.

These and other objectives are attained with an optical sensor and a method of operating an optical sensor. The sensor comprises a multitude of pixels, an amplifier and a switching circuit. Each of the pixels includes an optical detector for generating an electric signal representing the intensity of light incident on the pixel. The switching circuit is electrically connected in series between the amplifier and the optical detectors for conducting the electric signals from the optical detectors to the amplifier in a predetermined manner. Preferably, the switching circuit includes a multitude of switches, and each switch is used to control the transmission of the signal from a respective one of the optical detectors to the amplifier.

As an example, the switching circuit may be operated to conduct the electric signals, one at a time, from the optical detectors to the amplifier. As another example, the switching circuit may be operated to conduct sets of the electric signals, one set at a time, from the optical detectors to the amplifier.

The electric switching technique employed in this invention eliminates the need for mechanical toggling and in particular, eliminates the need for a toggle mirror and all of the associated difficulties. At the same time, the electronic toggling used in the present invention provides the same advantages in detector architecture as a mechanically toggled system. In addition, the electronic switching circuit used in this invention allows an image to be toggled differently over different regions or areas of a focal plane and, in a sensor having plural focal planes, allows an image to be toggled differently over different focal planes.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
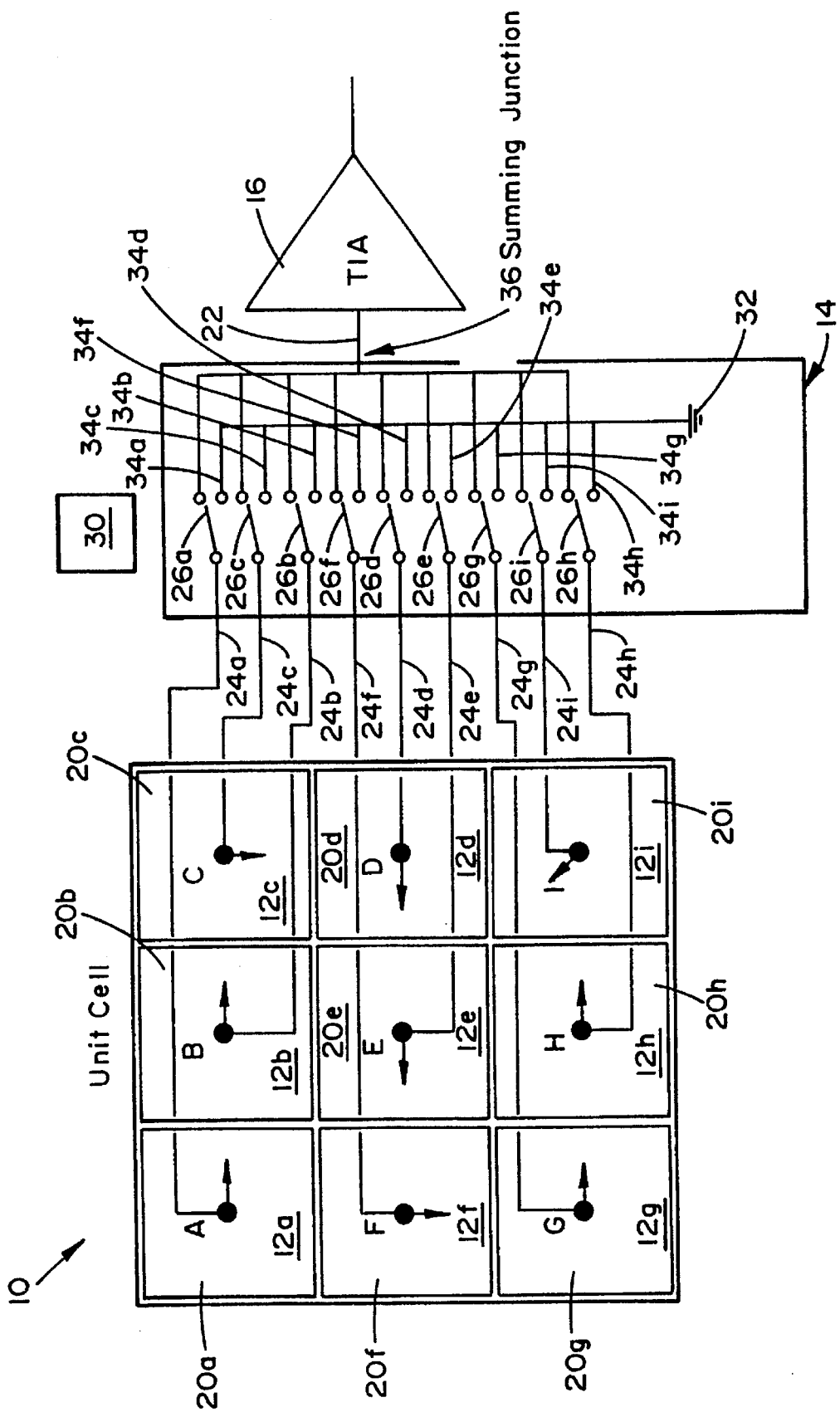
FIG. 1 diagrammatically illustrates a section or unit cell of an optical sensor, including a group of pixels and associated electronic circuitry, embodying the present invention.

FIG. 1 illustrates a section or unit cell 10 of an optical sensor. This cell includes a group of pixels 12a–12i, switching circuit 14 and amplifier 16. Each of the pixels 12a–12i includes one of optical detectors 20a–20i, and preferably each pixel is formed by a respective one of the optical detectors. In addition, preferably, switching circuit 14 includes output line 22, a multitude of input lines 24a–24i, a multitude of switches 26a–26i, switch control means 30, ground connection 32, and a multitude of ground lines 34a–34i.

Generally, each of the optical detectors 20a–20i is associated with a respective one of the pixels 12a–12i for generating an electric signal representing the intensity of light incident on that one pixel. Switching circuit 14 is connected to optical detectors 20a–20i and to amplifier 16 to transmit the electric signals from the optical detectors to the amplifier in a predetermined manner. Amplifier 16 receives the electric signals from switching circuit 14 and amplifies those signals.

In operation, an image, or a portion of an image, is incident on cell 10, and each of detectors 20a–20i generates an electric signal representing the intensity of light incident on the associated one of the pixels 12a–12i. Switching circuit 14 conducts the signals from photodetectors 20a–20i to amplifier 16 in or according to a predetermined manner. For example, these signals may be conducted to amplifier 16 so that, over a given cycle, one and only one signal from each photodetector is conducted to the amplifier, until signals from all the photodetectors of cell 10 have been received by the amplifier; and this cycle may be repeated as long as cell 10, or the optical sensor in which the cell is located, is operating. Alternatively, photodetectors 20a–20i may be separated into subsets; and switching circuit 14 may be operated so that the signals from each individual subset of photodetectors are simultaneously conducted to amplifier 16, and the signals from different subsets of photodetectors are conducted in sequence to the amplifier.

Detectors 20a–20i are located in a common plane and form an image or focal plane. Also as depicted in FIG. 1, optical detectors 20a–20i are located closely adjacent to each other, in a regular, two-dimensional array, and each detector forms and defines one pixel.

As shown in FIG. 1, pixels 12a–12i are arranged in a three-by-three array, forming a group of nine pixels. As will be understood by those of ordinary skill in the art, unit cell 10 may have more or fewer pixels than are shown in FIG. 1; and, further, the pixels of a unit cell 10 may be arranged in a shape other than a square. For instance, unit cell 10 may have four pixels arranged in a two-by-two array, eight pixels arranged in a four-by-two array, or three pixels arranged in a one-by-three array.

As previously mentioned, switching circuit 14 transmits the electric signals from detectors 20a–20i to amplifier 16, in a preselected manner. More specifically, each of the input lines 24a–24i of circuit 14 is electrically connected in series between output line 22 of the switching circuit and a respective one of the optical detectors 20a–20i for conducting an electric signal from that one optical detector to amplifier 16.

Each of the switches 26a–26i is located in a respective one of input lines 24a–24i for controlling the transmission of electric signals through that one of the input lines. In particular, each of the switches 26a–26i has first and second states. In the first state, the switch is conductive and conducts the electric signal from the associated optical detector to amplifier 16; and in the second state, the switch prevents the electrical signal from the associated optical detector from being transmitted to amplifier 16, and instead that signal is shunted to ground. FIG. 1 schematically represents switches 26a–26i as mechanical switches, movable between two positions in which they are connected to contacts. Preferably, though, switches 26a–26i are electronic switches and the switches are changed between the above-mentioned first and second states by the application of gate voltages.

Control means 30 is provided to control or operate switches 26a–26i so that the signals from photodetectors 20a–20i are conducted to amplifier 16 in the desired manner. When more than one switch is closed at a time, the signals from the corresponding photodetectors—that is, the photodetectors that correspond to the closed switches—are summed by amplifier 16 operating in a transimpedance mode. With the preferred embodiment of switching network 14, in which switches 26a–26i are gate controlled electronic switches, control means 30 applies the requisite gate voltages to those switches to change the switches between their first and second states in the desired manner. This control means 30, for example, may apply first and second voltage levels to switches 26a–26i to cause the switches to assume their first and second states, respectively.

An operator may operate control means 30 to change switches 26a–26i between their first and second states in the desired manner, or control means 30 may be designed to change the switches automatically between their first and second states in accordance with a preset program or sequence. Switches 26a–26i may be operated in any suitable sequence; and, for example, as schematically represented by the arrows in FIG. 1, these switches may be switched into the first state in the order: 26a, 26b, 26c, 26d, 26e, 26f, 26g, 26h and 26i. Alternatively, switches 26a–26i may be operated so that, during a given cycle, the signals from photodetectors 20a, 20b and 20c are summed and applied to amplifier 16 at a first time; the signals from photodetectors 20d, 20e and 20f are summed and applied to the amplifier at a second time; and the signals from photodetectors 20g, 20h and 20i are summed and applied to the amplifier at a third time.

Preferably, when each switch is in the second state, the switch electrically connects the input line, in which the switch is located, to a respective one of the ground lines 34a–34i. As a result, the switch thus brings the electric voltage of the associated optical detector to a ground level. In addition, preferably each switch has only two states, and the switch is in the second state whenever it is not in the first state.

Figure 2:
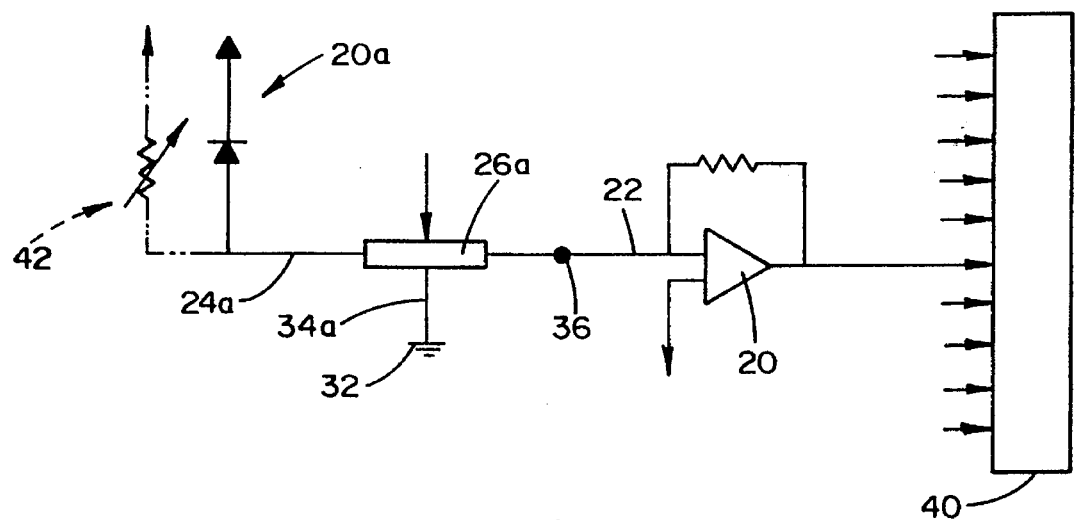
FIG. 2 is a schematic diagram of the preferred focal plane circuitry associated with each detector of the optical sensor.

FIG. 2 shows in greater detail, the focal plane circuitry associated with a single photodetector 20a. Detector 20a has its output connected to input line 24a, and switch 26a is located in that input line. When switch 26a is in the first state, current from photodetector 20a is conducted to summing junction 36 and then to preamplifier 20 and this amplifier feeds its output to multiplexer 40. Multiplexer 40 has parallel input branches from other sensor circuits, and a control circuit (not shown) to control or identify the output signals conducted off the multiplexer.

The circuit of FIG. 2 is designed for the use of photovoltaic detectors. If photo-conductive detectors are used, an exterior current source 42 (shown in phantom) is included. One or more filters (not shown) may be included in the circuit shown in FIG. 2, either to process the electric signals conducted through the circuit or to select particular frequencies or frequency bands for transmission through the circuit. Photodetectors 20a–20i, switches 26a–26i, amplifiers 20 and multiplexer 40 may be standard, conventional elements.

Figure 3:
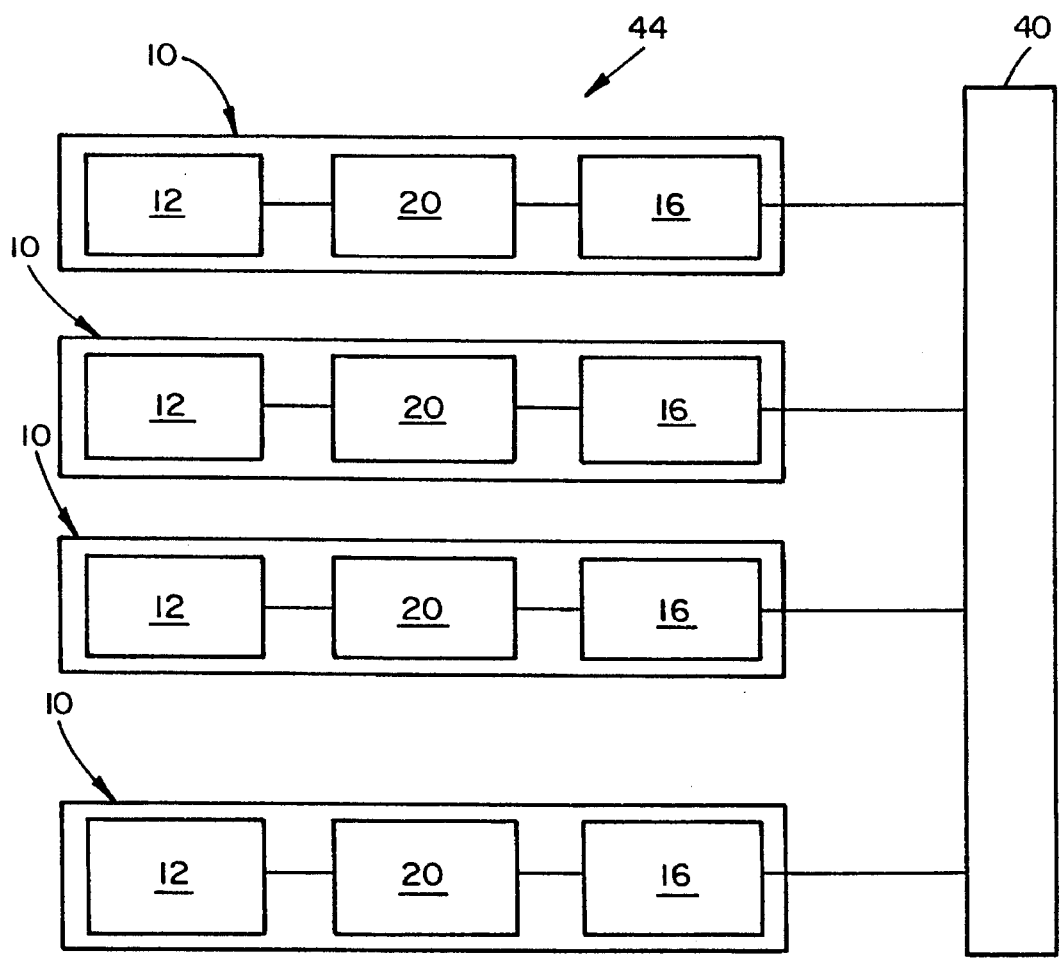
FIG. 3 shows diagrammatically an optical sensor formed by combining a multitude of cells of the type shown in FIG. 1.

With reference to FIG. 3, preferably, each unit cell 10 is one of many such unit cells included in a two-dimensional array, schematically illustrated at 44. More specifically, FIG. 3 shows four unit cells 10, and each unit cell includes a plurality of pixels generally designated at 12, a plurality of photodetectors generally designated at 20, and a toggling circuit 14. From each unit cell, an output line leads to multiplexer 40. The array shown in FIG. 3 constitutes a staring array, unless scanning means are interposed between the two-dimensional array and the viewed scene. In addition, as will be understood by those of ordinary skill in the art, sensor 44 may be provided with additional elements or features not specifically shown in the drawings.

Array 44 substitutes an all electronic toggling technique for a mechanical toggling technique, and thus eliminates the need for a toggle mirror and all of the associated difficulties. At the same time, the electronic toggling used in the present invention provides the same advantages in detector architecture as a mechanically toggled system, namely, a large unit cell for the electronic circuitry, but a small physical detector for fine spatial resolution. Since toggling is controlled independently for each small group of detectors, the sensor can be divided into local regions where selected, or all, groups of detectors are toggled, while the remaining groups, if any, are not toggled. In contrast, when toggling is achieved with a mirror, the motion of the image is usually global.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An optical sensor comprising:
   a multitude of pixels, each of the pixels including an optical detector for generating an electric signal representing the intensity of light incident on said each pixel;
   an amplifier, and
   a switching circuit electrically connected in series between the amplifier and the optical detectors for conducting the electric signals from the optical detectors to the amplifier in a predetermined manner, the switching circuit including means for selectively conducting to the amplifier the signal from only one of the optical detectors at first times, and conducting to the amplifier the signals from more than one of the optical detectors at second times which are different from the first times; and
   wherein the amplifier amplifies the electric signals conducted to the amplifier.

2. An optical sensor according to claim 1, wherein the switching circuit includes:
   an output line connected to the amplifier;
   a multitude of input lines, each of the input lines being electrically connected in series between the output line and a respective one of the optical detectors; and
   a multitude of switches, each of the switches being located in a respective one of the input lines to control the transmission of the electric signals through said one of the input lines.

3. An optical sensor according to claim 2, wherein each switch has
   a first state to conduct electric signals through the input line in which the switch is located and to the amplifier; and
   a second state to prevent electric signals from being transmitted through the input line in which the switch is located.

4. An optical sensor according to claim 3, wherein the switching circuit further includes control means connected to each of the switches to change the switches between the first and second states.

5. An optical sensor according to claim 4, wherein the switching circuit includes means to prevent more than one of the electric signals from being simultaneously transmitted through the switching circuit and to the amplifier.

6. An optical sensor according to claim 4, wherein the control means includes means to change the switches between the first and second states according to a predetermined program.

7. An optical sensor according to claim 3, wherein:
   the switching circuit further includes a multitude of ground lines; and
   when each of the switches is in the second state, said each switch is connected to one of the ground lines to maintain the optical detector connected to the input line in which said each switch is located, at a ground voltage level.

8. An optical sensor comprising:
   a multitude of unit cells, each of the unit cells consisting of
   i) a plurality of pixels, each of the pixels including an optical detector for generating an electric signal representing the intensity of light incident on said each pixel,
   ii) a switching circuit connected to the optical detectors to receive the electrical signals therefrom, and including (1) an output line, (2) a plurality of input lines, each of the input lines being electrically connected in series between the output line and a respective one of the optical detectors, and (3) a plurality of switches, each of the switches being located in a respective one of the input lines and having first and second states, and
   iii) an amplifier connected to the output line of the switching circuit for receiving electric signals therefrom and amplifying said received electric signals;
   wherein when each switch is in the first state, the switch conducts electric signals through the input line in which the switch is located and to the amplifier; and when each switch is in the second state, the switch prevents electric signals from being transmitted through the input line in which the switch is located and to the amplifier; and
   wherein the switching circuit further includes (4) means for selectively conducting to the amplifier the signal from only one of the optical detectors at first times, and conducting to the amplifier plural signals from more than one of the optical detectors at second times which are different from the first times.

9. An optical sensor according to claim 8, wherein the switching circuit further includes control means connected to each of the switches to change the switches between the first and second states.

10. An optical sensor according to claim 9, wherein the control means includes means to prevent more than one of the switches from being simultaneously in the first state.

11. An optical sensor according to claim 9, wherein the control means includes means to change the switches between the first and second states according to a predetermined program.

12. An optical sensor according to claim 8, wherein:
   the switching circuit further includes a multitude of ground lines; and
   when each switch is in the second state, the switch is connected to one of the ground lines to maintain the optical detector connected to the input line in which said each switch is located, at a ground voltage level.

13. A method of operating an optical sensor of the type having a multitude of pixels and a multitude of optical detectors for generating electrical signals representing the intensity of light incident on the pixels, the method comprising the steps of:

conducting the electric signals from the optical detectors to a switching circuit;

conducting the electric signals through the switching circuit and to a common amplifier in a predetermined manner; and amplifying the electric signals conducted to the amplifier;

wherein the step of conducting the electric signals through the switching circuit and to the common amplifier includes the steps of i) conducting to the amplifier the signal from only one of the optical detector at first times, and ii) conducting to the amplifier the signals from more than one of the optical detector at second times which are different from the first times.

14. A method according to claim 13, wherein:

the switching circuit includes an output line, a multitude of input lines and a multitude of switches;

the output line is connected to the amplifier, and each of the input lines is electrically connected in series between the output line and a respective one of the optical detectors;

each of the switches is located in a respective one of the input lines and has a first state and a second state;

in the first state, each switch conducts electric signals to the output line from the one of the input lines in which the switch is located;

in the second state, each switch prevents electric signals from being conducted to the output line from the one of the input lines in which the switch is located; and the step of conducting the electric signals through the switching circuit includes step of changing the switches between the first and second states to selectively conduct electric signals through the switches and to the output line.

15. A method according to claim 14, wherein the step of changing the switches between the first and second states includes the step of having one, and only one, of the switches at a time in the first state.

16. A method according to claim 14, wherein the step of changing the switches between the first and second states includes the step of changing the switches in a predetermined sequence between the first and second states.

17. A method according to claim 14, wherein:

the switching circuit includes a multitude of ground lines; and when each switch is in the second state, the switch electrically connects the input line in which the switch is located to a respective one of the ground lines.

18. A method according to claim 16, wherein the step of changing the switches between the first and second states includes the step of maintaining each switch in the second state whenever the switch is not in the first state.

* * * * *